(12) United States Patent
Smith et al.

(10) Patent No.: US 7,726,605 B1
(45) Date of Patent: Jun. 1, 2010

(54) AERIAL SENSOR POD DEPLOYMENT SYSTEM

(75) Inventors: James E. Smith, Bruceton Mills, WV (US); Roy S. Nutter, Jr., Morgantown, WV (US); Gregory J. Thompson, Morgantown, WV (US); Zenovy S. Wowczuk, Morgantown, WV (US); Gerald M. Angle, II, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 81 days.

(21) Appl. No.: 11/870,176

(22) Filed: Oct. 10, 2007

Related U.S. Application Data

(62) Division of application No. 10/996,885, filed on Nov. 24, 2004, now Pat. No. 7,387,276.

(51) Int. Cl.
*B64D 47/08* (2006.01)
*B64D 47/00* (2006.01)
(52) U.S. Cl. ............... 244/118.3; 244/137.1; 244/118.1
(58) Field of Classification Search .............. 244/118.1, 244/129.4, 129.5, 118.3, 136, 137.1, 159.5, 244/172.6; 74/89.23–89.45, 424.71–424.96; 343/705, 708, 915
See application file for complete search history.

(56) References Cited

U.S. PATENT DOCUMENTS

| | | | | |
|---|---|---|---|---|
| 4,114,839 A | * | 9/1978 | Sibley et al. | 244/118.1 |
| 4,635,067 A | * | 1/1987 | Fitzpatrick | 343/705 |
| 6,170,781 B1 | * | 1/2001 | Sherrill et al. | 244/129.5 |
| 6,616,097 B2 | * | 9/2003 | Hilbert | 244/118.1 |
| 2005/0029398 A1 | * | 2/2005 | Lowe et al. | 244/118.1 |

* cited by examiner

*Primary Examiner*—Michael R Mansen
*Assistant Examiner*—Joshua J Michener
(74) *Attorney, Agent, or Firm*—Steptoe & Johnson PLLC

(57) ABSTRACT

A roll-on/roll-off, aircraft-borne sensor pod deployment system having an operator station and a sensor pallet system and method of using same. The operator station has a base platform, a shelter box mounted on the base platform for accommodating a human operator, and a computer installed inside the shelter box. The sensor pallet system has a base platform, a linear system mounted on the base platform, a rotational system mounted on the linear system, a mechanical arm attached to the rotational system, a sensor pod attached to the mechanical arm, and an electrical control system that provides power to the deployment system and controls movements of the sensor pallet system. In operation, the sensor pod can be retracted into a compact, stowing position, or extended out an opening in the aircraft for an unobstructed field of view. The deployment system optionally includes an apparatus and method for sealing the aircraft opening.

9 Claims, 12 Drawing Sheets

AERIAL SENSOR POD DEPLOYMENT SYSTEM

CROSS REFERENCE TO RELATED APPLICATIONS

This application is a divisional of U.S. patent application Ser. No. 10/996,885 filed Nov. 24, 2004 now U.S. Pat. No. 7,387,276.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of GSA Contract No. GST0404DE141 awarded by the National Guard Bureau Counterdrug Office.

BACKGROUND OF THE INVENTION

1. Field of the Invention

This invention relates to sensor deployment systems, and in particular, to an aircraft-borne system for deploying a sensor pod with an unobstructed field of view.

2. Description of the Related Art

The technology of aerial sensors has become an increasingly popular field of research and development for military and civilian aircraft. Aerial sensor platfoinis have always experienced limitations in terms of their field of view with respect to a ground target. The positioning (side doors, rear cargo ramps, sensor pods attached to plane structures, etc.) of a sensor platform on the plane can severely limit the field of view capabilities of the sensors on the sensor platfoini. Data collected from such sensors is therefore limited.

For example, one or more sensors may be placed on a simple boom and extended straight out the rear cargo ramp of an aircraft such as a C-130. The field of view of such boom-extended sensors is limited by the body of the aircraft. Such sensors may not be able to collect data from areas in front of the aircraft. Additionally, the use of boom-extended sensors can be problematic at high altitudes. At flight levels above a ceiling of 10,000 feet, it is necessary to seal the cargo holds of aircraft such as C-130s in order to maintain proper air pressure for the safety and comfort of the crew and operators, and thereby achieve full mission support capabilities for reconnaissance and/or data collection needs. However, the boom itself, power cords, and data cords prevent the rear cargo door and ramp from fully closing while the sensors are deployed outside the rear of the aircraft. Furthermore, sensors placed on the end of a boom may not have the required stability for precision data collection, nor would the sensors be protected from weather and high drag forces experienced during flight.

Other considerations applicable to the use of aircraft-borne sensors are the space and resources available in the aircraft and the ease with which the sensor system is loaded and unloaded from the aircraft. The only resources aboard a C-130 aircraft immediately useful without modification to the aircraft for remote sensing applications are electrical power and communication connectors accessible from the cargo bay. A sensor deployment system used on a C-130 aircraft must therefore not only conform to the dimensional and weight limits imposed by the C-130 aircraft design and operation, but must also conform to the electrical limits likewise imposed by the C-130 aircraft design and operation. Military aircraft such as the C-130 require the use of "standard" pallets as a base platform for transporting cargo to prevent damage to the floor of the aircraft and for ease and speed of loading and unloading the aircraft. For this purpose, a standard 463L Systems Cargo Pallet is used on C-130 aircraft by the United States Armed Forces. To ease and speed the loading and unloading of the C-130 aircraft, these pallets are loaded into C-130 aircraft by means of a series of roller systems on the floor of the rear cargo ramp and on the floor inside the C-130 fuselage. A sensor system used on a C-130 aircraft therefore preferably is compatible with the floor and roller systems on a C-130 aircraft.

For the foregoing reasons, there is a need for a robust, roll-on/roll-off system for deploying sensors out of the rear cargo door of an aircraft such that the sensors remain stable and protected, with an unobstructed field of view. There is also a need for a system for sealing the cargo hold of an aircraft where the rear cargo doors are partially opened to accommodate the aforementioned sensor deployment system.

SUMMARY OF THE INVENTION

The present invention is directed to an apparatus, system, and method that satisfies the need for a robust, roll-on/roll-off system for deploying sensors out of the rear cargo ramp of an aircraft such that the sensors remain stable and protected, with an unobstructed field of view. The present invention is also directed to an apparatus system and method that satisfies the need for a system for sealing the cargo hold of an aircraft where the rear cargo door and ramp are partially opened to accommodate the aforementioned sensor deployment system. The system comprises a first pallet assembly having an enclosure housing operators, electrical equipment, computers, and communication equipment. The system further comprises a second pallet assembly having a sensor pod in communication with the first pallet assembly, wherein the sensor pod is deployable out the partially-open rear cargo door and ramp of an aircraft such that the sensor pod has an unobstructed or enhanced field of view. Additionally, the system further comprises a system for sealing closed the partially-open rear cargo doors of an aircraft having a deployed sensor pod.

An aspect of the present invention is a storable, rapidly deployable, roll-on/roll-off, two-palletized system. The first pallet assembly is an enclosure placed within the main cargo hold of the aircraft. This enclosure houses the sensor operators (personnel), electrical power conditioning, the control computers for the sensor array, and the communications equipment. The second assembly is a smaller pallet that attaches to the rear ramp of the aircraft. The system of the present invention maximizes mission flexibility, stability and structural soundness, field of view, ease of use to the operator, storability, modular attachment space, and flexibility for a wide range of remote sensing and communications technologies. The sensors deployed on this system thus have a useable field of view so that imaging sensors can "see" targets unobstructed. Major components of the system of the present invention include a gear reducer with attached rotation motor, a (linear) translation motor, and sensor pallet equipment. The electrical impact of the system of the present invention upon the power supplied by C-130 aircraft generators, even with numerous sensors mounted and deployed, is minimal. The sensor pallet deployment and recovery process may be carried out in automatic, manual, or emergency hand-crank (recovery only) mode. Deployment of the system of the present invention includes initial loading of the pallets into an aircraft and mechanical translation and rotation of the sensor pod into position beneath the aircraft.

The present invention compensates for obstructions and specific line of site of targets. The present invention controls the angle, with respect to the ground, of the sensor pod. The present invention can increase and decrease the angle, with respect to the ground, of the sensor pod during an ongoing mission.

The present invention includes a system designed to deploy out the rear cargo door of an aircraft, preferably a C-130 cargo aircraft (versions B though J), that is in-flight deployable and capable of reading, interpreting, and delivering near-real-time data (by means of cameras and sensors) from the sensors to sensor operators and to ground stations. The system preferably has two roll-on/roll-off units: an operator station and a sensor platform. The entire system requires no modification to the aircraft and is capable of operating completely from the power supplied by the aircraft.

The sensor platform preferably uses a reinforced pallet, such as a standard 463L pallet, as the base structure, which is positioned on the rear cargo ramp of the aircraft during use. The reinforced base sensor pallet structure provides the support for the linear and rotational systems to translate and rotate the mechanical arm/sensor pod system to the final operational position. The sensor platform is the system that houses all of the sensors (by means of the sensor pod) and translates and rotates from within the rear cargo door ("stow" position) of the aircraft to the final operational position outside and underneath the rear cargo ramp of the aircraft. The base sensor pallet system, translation system, rotational system, and mechanical arm/pod system are all connected and work individually to complete the translation and rotation processes to place the sensor pod beneath the aircraft in an appropriate position.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
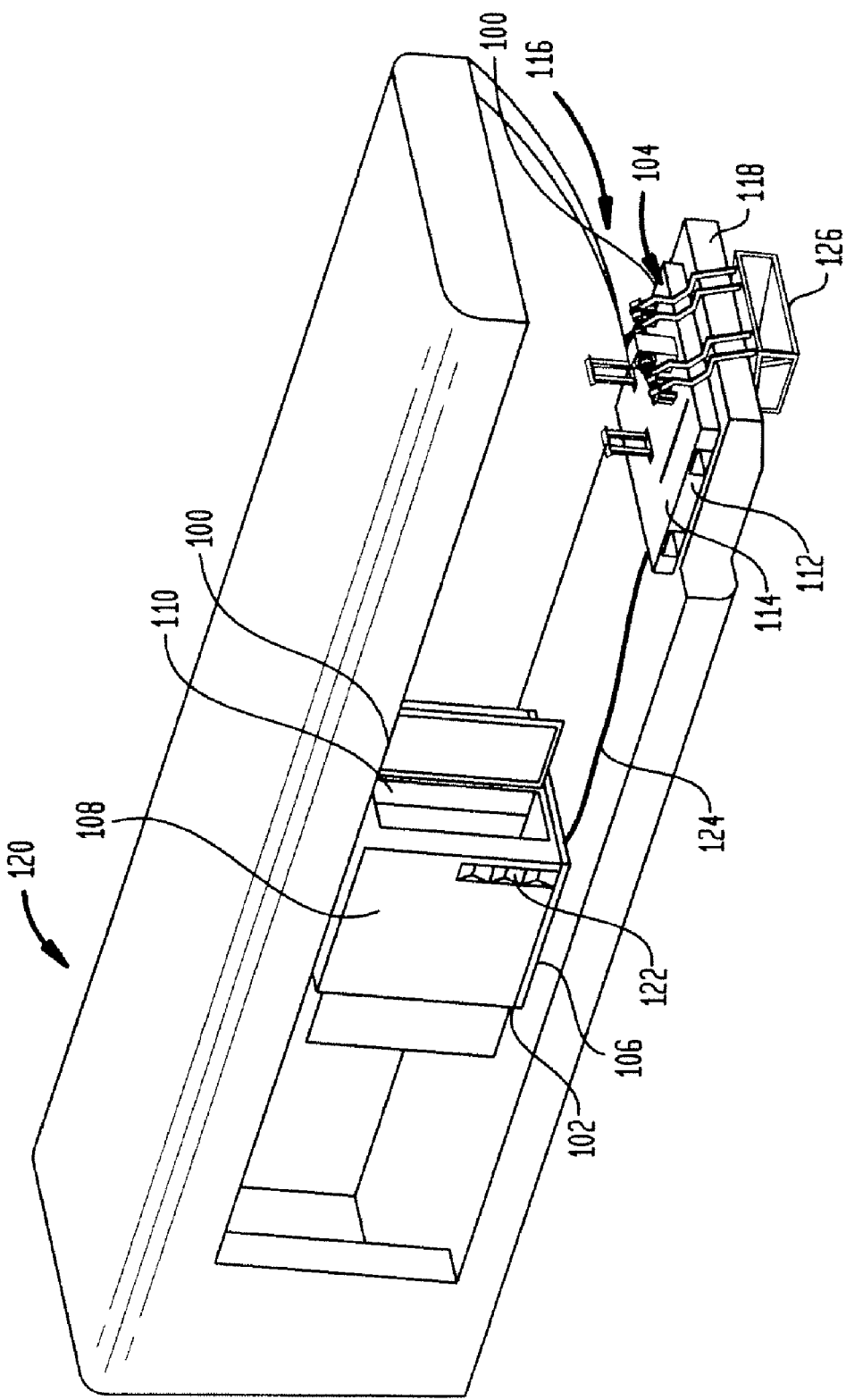
FIG. 1 is a perspective view of an embodiment of a sensor pod deployment system of the present invention loaded in the fuselage of an aircraft with the sensor pod extended out a rear opening.

The present invention is directed to a roll-on/roll-off system for deploying a sensor pod out an opening on an aircraft such that sensors mounted to the sensor pod have an increased or unobstructed field of view. With reference to the drawings, and in particular to FIG. 1, an embodiment of an aircraft-borne sensor pod deployment system 100 comprises an operator station 102 and a sensor pallet system 104. The operator station 102 comprises an operator station base platform 106, a shelter box 108, and an operator station computer 110. The sensor pallet system 104 comprises a sensor pallet base platform 112 and a sensor pod 126. The operator station 102 is preferably positioned inside a fuselage or cargo hold of an aircraft 120. The sensor pallet system 104 is preferably positioned near the operator station 102 inside the aircraft 120, and also near an opening 116 on the aircraft 120, such as near the opening 116 created by the lower cargo ramp and upper cargo door in the rear of a C-130 military cargo aircraft. The sensor pod 126 is thus deployable out of the opening 116 of the aircraft 120 such that it has a relatively unobstructed field of view underneath the aircraft 120.

Operator Station Base Platform

Figure 2:
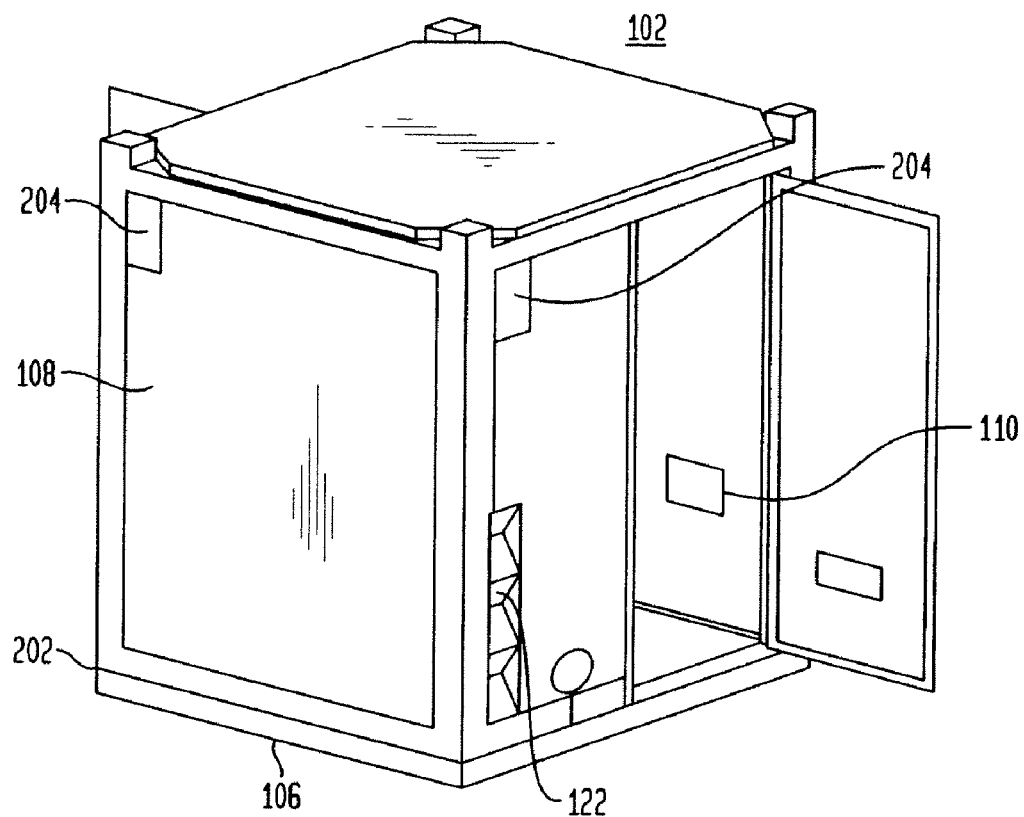
FIG. 2 is a perspective view of an embodiment of an operator station of the sensor pod deployment system of FIG. 1.
Figure 3:
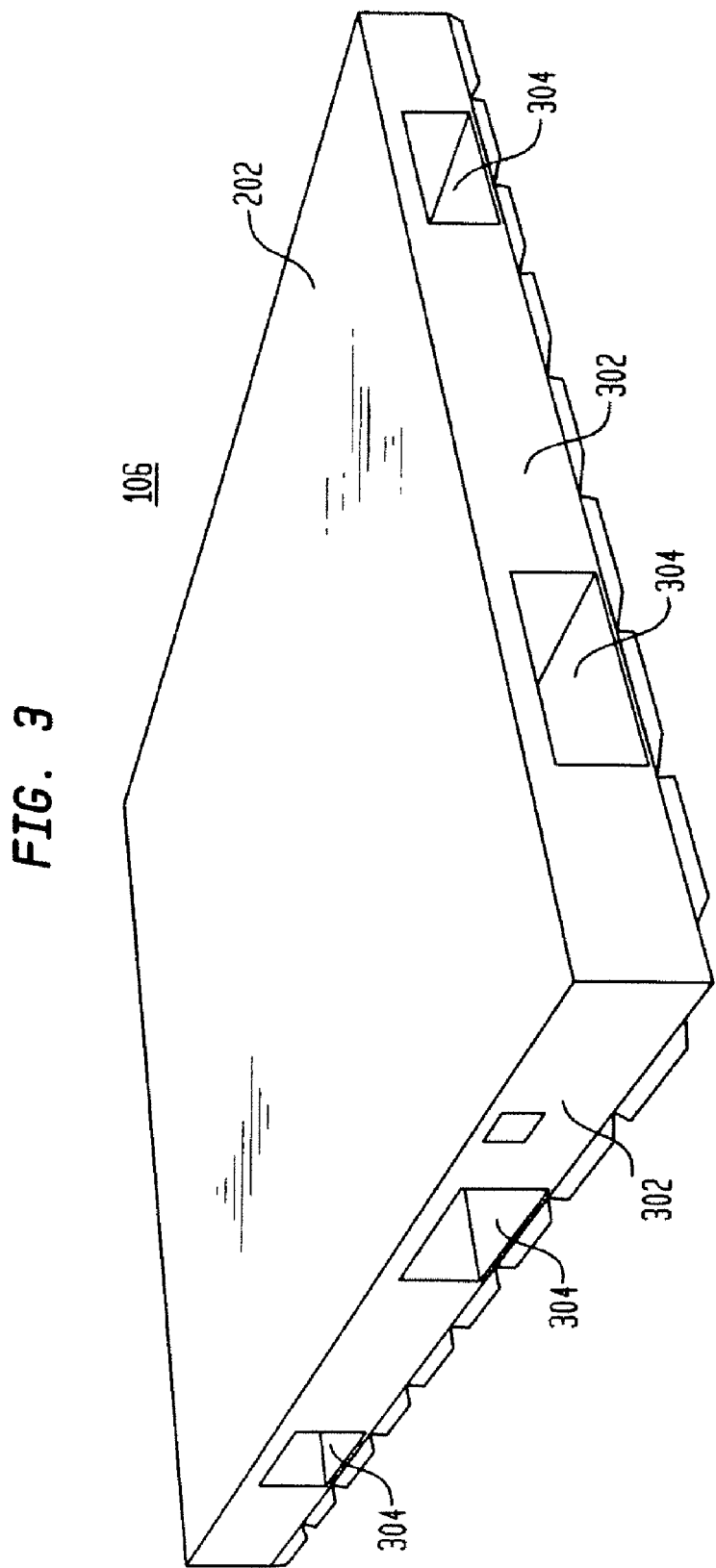
FIG. 3 is a perspective view of an embodiment of an operator station base platform of the operator station of FIG. 2.

As shown in FIGS. 2 and 3, the shelter box 108 is attached to an operator station base platform top surface 202 on the operator station base platform 106. A standard 463L type air cargo hauling pallet (e.g., from AAR Mobility Systems) is preferably modified for use as a suitable base for the standardized sensor pallet system 104. Specifically, the aluminum skin/balsa wood sheet of a standard 463L type cargo hauling pallet is replaced with a reinforcing structure such as a three-quarters of an inch thick #6061T6 aluminum plate as the operator station base platform top surface 202. This reinforcement provides structural support and provides a thick skin to support drilling and tapping modifications to securely attach components to the operator station base platform top surface 202. An internal grid 302 of "hard point" sections is also preferably installed to provide additional mounting support and to provide the pallet with a cavity 304 suitable for receiving forklift tines for easy transport. The operator station base platform 106 is preferably rectangular in shape having a length, width, and height of about one hundred eight inches by about eighty-eight inches by about six and one-half inches, and preferably has cavities 304 useful in loading by loading machinery such as forklifts.

Shelter Box

As shown in FIG. 2, a shelter box 108 suitable for accommodating at least one human operator stands on the operator station base platform top surface 202. The shelter box 108 is preferably about ninety-six inches by about eighty-four inches by about ninety inches in size, and is preferably substantially constructed of a suitable sturdy light weight material such as aluminum (e.g., a modified shelter box from Sea Box, Inc.). At least one exhaust fan 204 is preferably installed on the shelter box 108 to regulate atmospheric conditions, such as air temperature, inside the shelter box 108 (e.g., Dayton utility shutter-mounted exhaust fans). At least one rack mounted operator station computer 110 (e.g., from CyberResearch) is preferably installed inside the shelter box 108.

Sensor Pallet Base Platform

Figure 4:
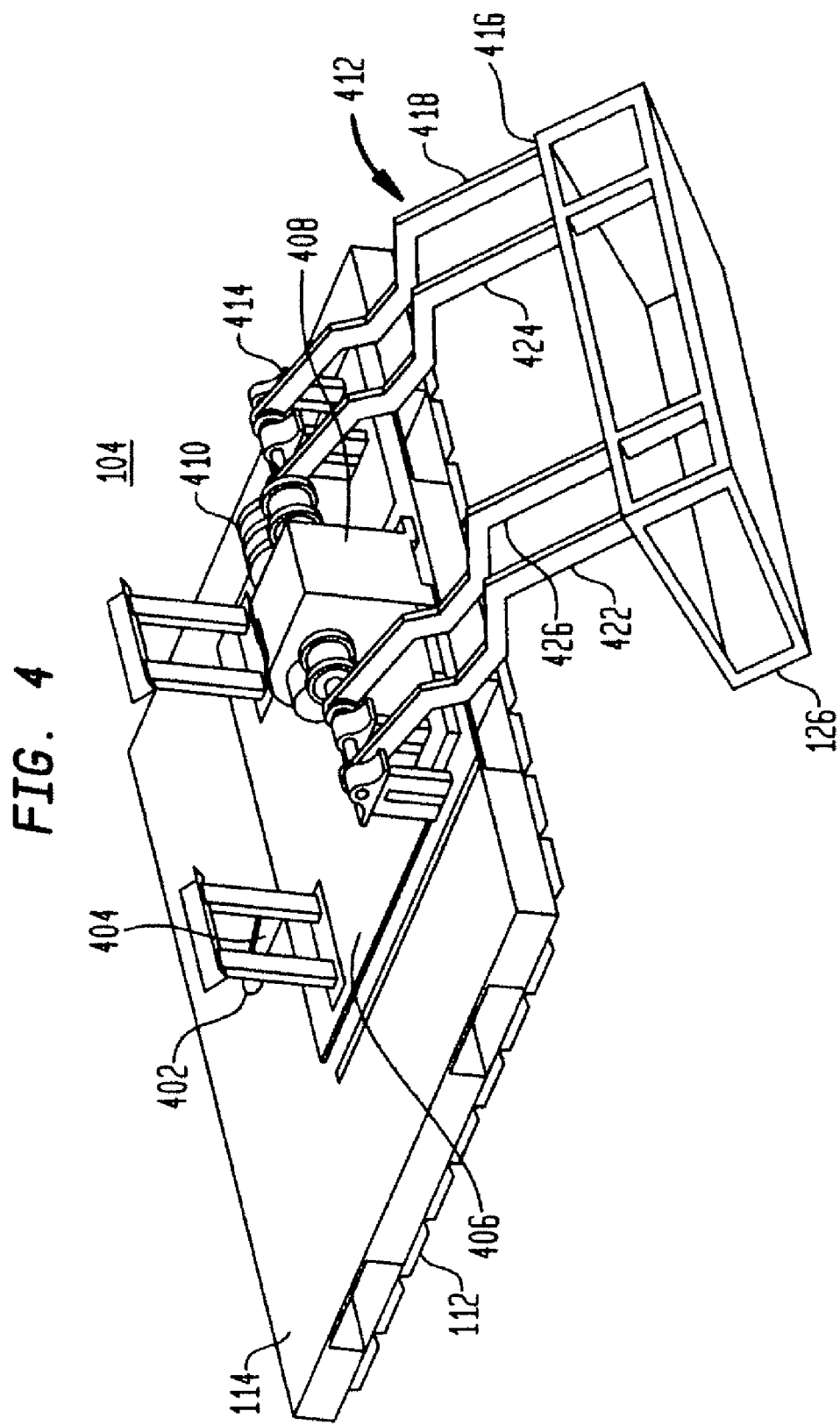
FIG. 4 is a perspective view of an embodiment of a sensor pallet system of the sensor pod deployment system of FIG. 1.

As shown in FIGS. 1 and 4, the sensor pallet system 104 includes a sensor pallet base platform 112 that is substantially similar in form and function to the operator station base platform 106. The sensor pallet base platform 112 has a sensor pallet base platform top surface 114 that is substantially similar in form and function to the operator station base platform top surface 202.

Linear Translation System

Figure 5:
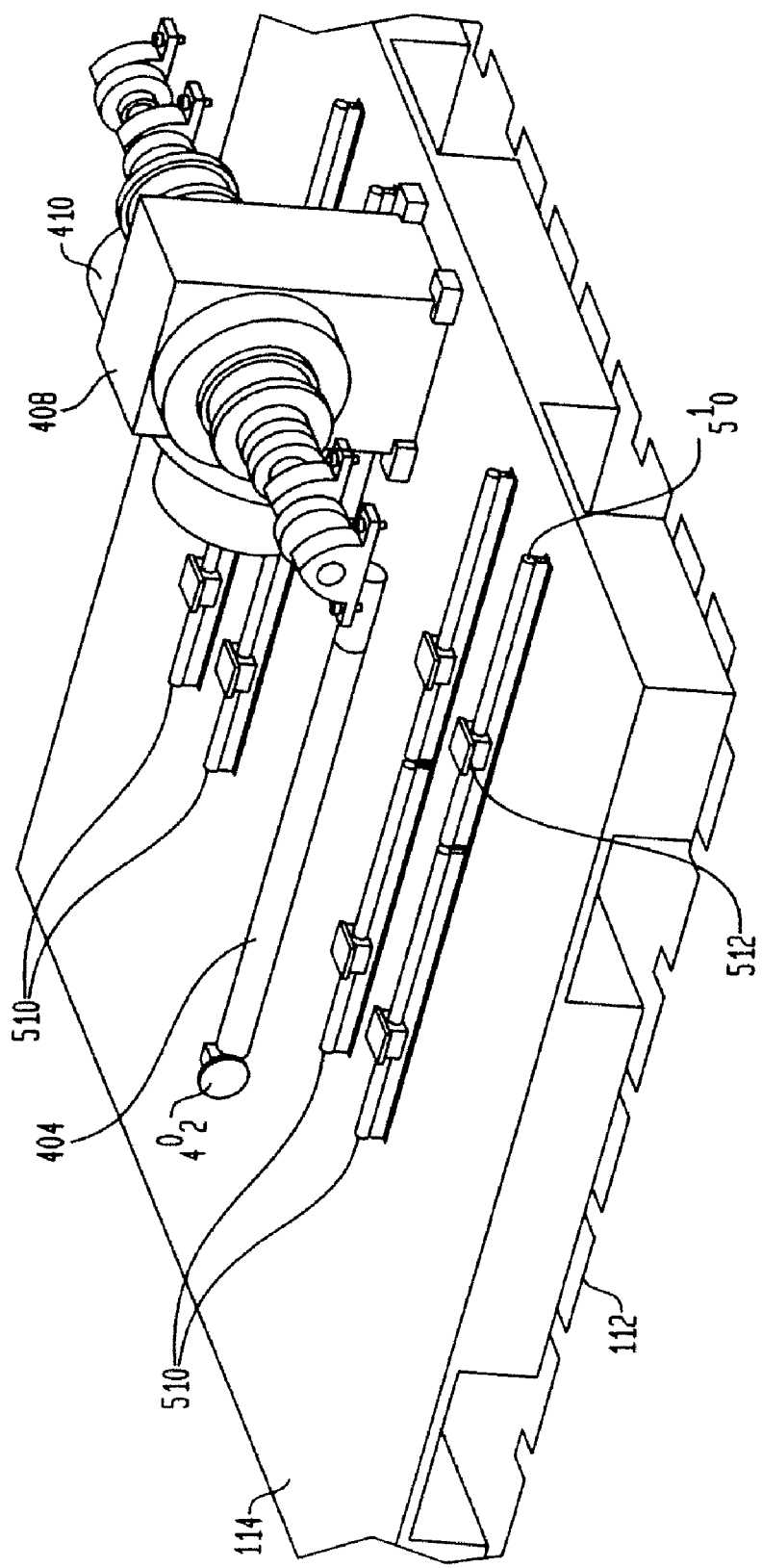
FIG. 5 is a perspective view of an embodiment of the sensor pallet system of FIG. 4 showing a sensor pallet base platform, a rotational system, and portions of a linear translation system.
Figure 6:
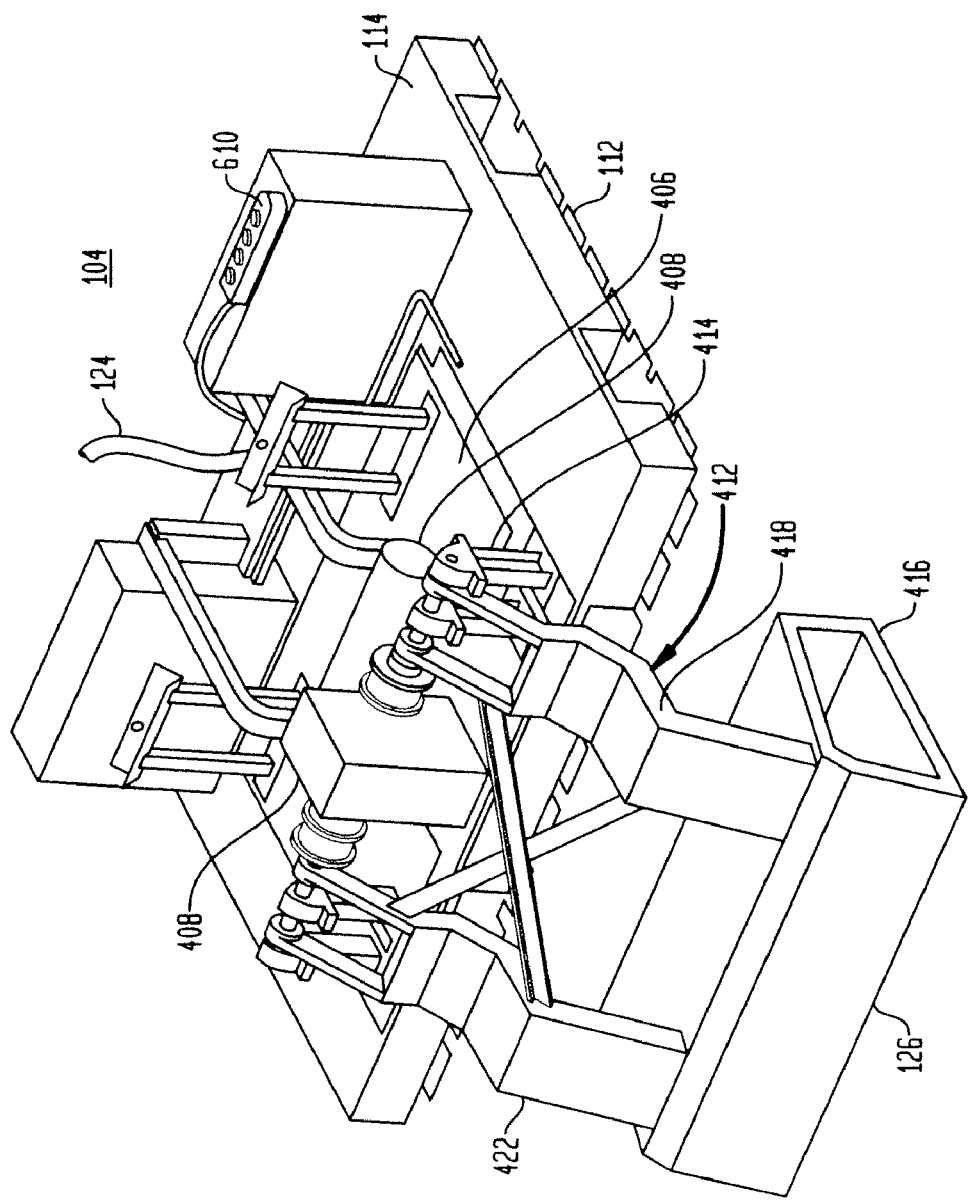
FIG. 6 is a perspective view of an alternative embodiment of the sensor pallet system of FIG. 4.
Figure 7:
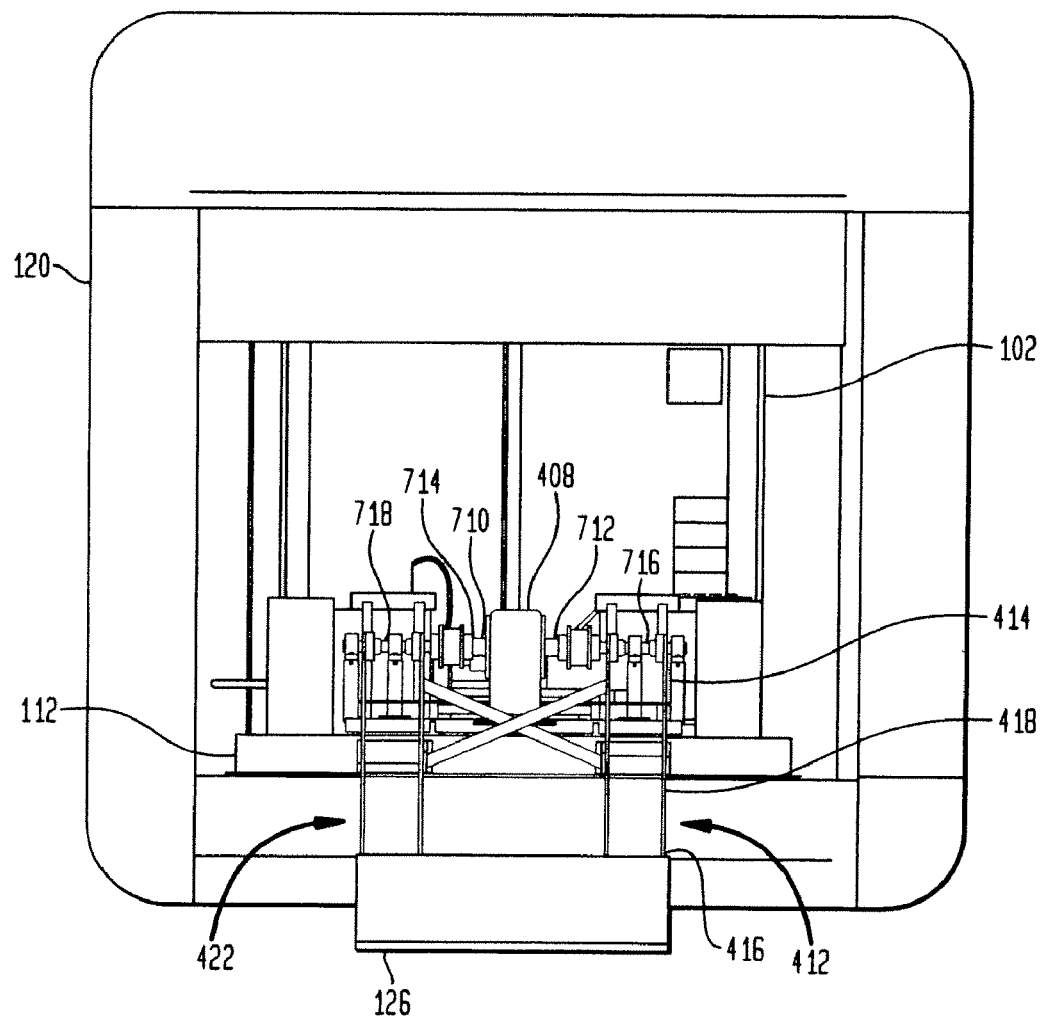
FIG. 7 is a front elevation view of an embodiment of the sensor pod deployment system of FIG. 1 loaded in a fuselage or on a rear ramp of an aircraft with a sensor pod extended out a rear opening.

As shown in FIGS. 4-6, the sensor pallet system 104 further comprises a linear translation system mounted on the sensor pallet base platform top surface 114. The linear translation system, also referred to as the linear system, performs linear movement that translates many of the components of the sensor pallet system 104 from a compact, "stow" position to a final operational position such that the sensor pod 126 is deployed outside the opening 116 of the aircraft 120. This linear translational system performs translational movement to extend the sensor pod 126, the rotational system, and the mechanical arms outside of the rear cargo ramp of the aircraft 120. After rotation of the pod/arm mechanism below the cargo ramp, translational movement in the reverse direction retracts the sensor pod 126 in firmly against the rear cargo ramp of the aircraft 120 for stability and additional range of movement. Translational movement also retracts the sensor pod 126 back inside the aircraft 120. The linear translational system is also the base platform for the entire rotational system described below. Whenever the linear translational system moves, it also translates the attached rotational system with it. The linear translational system includes a linear actuator 404 with a linear actuator motor 402, a base rail plate 406, and a linear guide assembly. A proximity sensor preferably senses and signals a controller causing the translation to stop when the base rail plate 406 extends out to within about fifteen millimeters of its intended fully extended position. A limit switch preferably causes the translation to stop when the base rail plate 406 extends about one-eighth of an inch beyond its intended fully extended position and serves as a backup. If the base rail plate 406 extends another one-eighth inch, solid blocks located under the base rail plate 406 and on the linear guide assembly will preferably contact one another, physically preventing further extension and either causing an automatic shut-off of the linear actuator motor 402, or holding the force of the linear actuator motor 402 without the solid blocks breaking.

Linear Actuator (With Motor)

The linear actuator 404 of the linear system must translate the entire base rail plate 406 (including the rotational system, mechanical arms, and sensor pod 126) close to or into the air stream located outside the opening 116 of the aircraft 120. A motor driven linear actuator 404 performs this translation in part because of its simplicity of design and capability of precision positioning. The linear actuator 404 also has a double extended input shaft to accommodate for manual operation of the translation mechanism through turning of the shaft (e.g., if power is lost).

In a preferred embodiment, the linear actuator 404 has a stroke length of twenty-four inches, which is determined by the size requirements of the mechanical arms and sensor pod 126. The mechanical arms and sensor pod 126 must have a proper amount of distance outside of the rear cargo ramp in order to rotate completely without coming into contact with the ramp itself. This translation needs a stroke length of eighteen inches in the preferred embodiment in order to complete the cycle without coming into contact with the airframe body of a C-130 aircraft 120. A stroke distance of twenty-four inches therefore provides an ample amount of clearance for the system and provides sufficient room for modifications of the preferred embodiment.

In the preferred embodiment, the linear actuator 404 has a load capacity of 5000 pounds so that it can provide the maximum amount of force needed to translate the linear system, the rotational system, the mechanical arms, and the sensor pod 126. The sensor pod 126 has a maximum load capacity that is limited by the rotational system's (described below) load capability and the overall size of the sensor pod 126. The maximum load capacity for the mechanical arms and sensor pod combination is approximately seven hundred pounds in the preferred embodiment. This includes another safety factor for modifications to the preferred embodiment.

The linear actuator 404 is preferably powered by an actuator motor 402, with a power of approximately one-third horsepower to overcome the gearing and friction forces.

The preferred embodiment uses a ball screw actuator, such as is made by Motion Systems Corporation, as the linear actuator 404. The attachment on one end of the linear actuator 404 is the only connection to the base rail plate 406, which translates, by means of a translating tube, most of the linear system, rotational system, mechanical arms, and sensor pod 126. The translating tube is preferably protected by an aluminum housing. The screw drive system in the ball screw actuator generates the torque needed to translate the sensor pallet system 104 that can be populated with about three thousand pounds of mechanical components and sensor equipment. The linear actuator 404 also attaches at the opposite end to the base rail plate 406 described below.

Base Rail Plate

The entire rotational system and linear system are connected directly or indirectly to the base rail plate 406 of the linear system. The base rail plate 406 is attached to the linear guide assembly that guides the linear translation of the rotation system, linear translation system, mechanical arms, and sensor pod 126. The base rail plate 406 is preferably constructed of one-half inch thick 6061 T6 aluminum, and is preferably rectangular shaped with a length ranging from about sixty-four to about ninety-six inches and a width of about fifty inches. The top surface of the base rail plate 406 preferably has conventional stiffening supports/diamond plating.

Linear Guide Assembly

Translation of the base rail plate 406 is accomplished in part by means of a linear guide bearing assembly that slidably connects the base rail plate 406 to the sensor pallet base platform top surface 114. A plurality of pillow block housings 512 are preferably bolted to the base rail plate 406. A plurality of parallel, linear bearings 510 are preferably attached (e.g., drilled and tapped) to the sensor pallet base platform top surface 114. The pillow block housings 512 slidably mate with the linear bearings 510. Thus, the sensor pallet base platform 112 provides the support structure for the linear guide assembly.

In a preferred embodiment, a set of about eight to twelve linear bearings 510, arranged in pairs, are attached to the sensor pallet base platform top surface 114 in about four to six rows. The linear bearings 510 thus have about four to six sets, each set having one linear bearing pair and two associated pillow block housings 512. The linear bearings 510 are preferably of a type like the Danaher Motion continuous support linear guides, and are bolted to the sensor pallet base platform top surface 114. Each linear bearing 510 is preferably twenty-four inch long and two and thirteen-hundredths inches wide, and is coupled with a pillow block/bearing housing assembly housing 512. The outside linear bearings 510 preferably start about twenty-four to about twenty-five inches from the sensor pallet base platform 112 edge, and the front facing linear bearings 510 nearest the rotational system preferably start about four and one-half inches from the pallet front face.

Preferably, the linear bearing 510 pairs run parallel to one another, the first linear bearing 510 pair being about 4.74 inches from a side of the base rail plate 406, the second linear bearing 510 pair being about twelve inches from the first linear bearing pair, the third linear bearing 510 pair being about twenty-two inches from the second linear bearing 510 pair, the fourth linear bearing 510 pair being about twelve inches from the third linear bearing 510 pair, and the fourth linear bearing pair being about 4.74 inches from the other side of the base rail plate 406. All of the linear bearing pairs run to within about one and one-half inches from the front face of the base rail plate 406. The linear bearings 510 within each linear bearing 510 pair are preferably separated by about one-half of an inch. Other similar configurations of linear bearings 510 are acceptable.

Rotational System

As shown in FIGS. 4-7, the sensor pallet system 104 further comprises a rotational system comprising a rotational gear reducer 408, a rotational gear reducer motor 410, and a first output shaft 716. The rotational system is preferably used to rotate the mechanical arms and sensor pod 126 from the "stow" position to the final operating position.

The rotational system performs the more difficult of the two movements (linear translation and rotational) needed to translate from the "stow" position to the final operational position located underneath the rear cargo ramp of the aircraft 120. The components of a preferred embodiment for rotation by the rotational system are a rotational gear reducer 408 with motor 410, output shafts 716, 718, gear reducer to shaft couplings, shaft bearings with supports, and shaft collars. Total amount of rotation is preferably about two hundred and thirty-nine degrees, and it preferably starts about three to five seconds after linear movement is complete. A proximity sensor preferably prevents over-rotation. Should rotation continue beyond a predetermined point, the system preferably senses this and automatically shuts off thereafter. After about a three to five second post-rotation delay, the linear translation system then is able to translate inward and thereby pull the sensor pod 126 close to the underbelly of the aircraft 120. This translation inward stops at a predetermined point such that the system contacts the aircraft at a skid point on the bottom of the cargo ramp. During this translation inward, a motor overcurrent sensor preferably turns off the linear actuator motor 402 after the torque reaches a pre-set threshold. This firmly locks the sensor pod against the bottom of the cargo ramp.

Gear Reducer (with Motor)

A rotational gear reducer 408 with a rotational gear reducer motor 410 provides the rotational system with rotational movement. A rotational gear reducer 408 is capable of producing a large torque by a lower torque input from a motor 410 due to internal gearing. In the preferred embodiment a rotational gear reducer 408 comprises a double enveloping worm gear reducer such as is the 30-60 double enveloping gear reducer manufactured by Textron Power Transmission.

Selection of the optimal rotational gear reducer 408 for the rotational system depends upon the maximum torque encountered by the gear reducer, which, in turn, depends upon the weight of the mechanical arms and sensor pod 126, the distance of the mechanical arms and sensor pod 126 from the rotational gear reducer 408, and the drag forces. Preferably the total rotational travel of the system spans from thirty-three degrees to two hundred seventy degrees beginning from the stow position inside the aircraft 120 and ending in the final operating position underneath the rear cargo ramp of the aircraft 120. The worst-case angle for maximum aerodynamic drag forces for a preferred embodiment of the mechanical arms and sensor pod 126 described herein occurs at about two hundred three degrees during the rotation of the mechanical arms and sensor pod 126. At this position the gear reducer system of the preferred embodiment must be capable of handling a torque of about 63,133 in-lbs. This calculation includes a 1.5 safety factor. The rotational gear reducer motor 410 is therefore preferably sized to accommodate a torque greater than this amount. A service factor of 0.8 is preferably used for the rotational gear reducer 408 and motor 410 so that the system experiences a very low duty cycle (about thirty minutes per day) and does not experience any shock during use. The overall running efficiency of the rotational gear reducer 408 is about sixty percent in optimal working conditions that include constant running speed, optimal working temperature, and minimal vibration. The rotational gear reducer 408 is preferably centered along the long side of the base rail plate 406 to generate a maximum area for the rotational shaft and the sensor pod 126 and to disperse the load equally along the entire rotational shaft.

In a preferred embodiment, a rotational gear reducer 408 is a cone drive 30-60 double reduction, 600:1, with double extended input shafts and double extended outputs, a 145 TC motor adapter, and an additional 8:1 gear reducer and coupling, used with a two horsepower motor 410 with a GS2-22PO 2.0HP motor controller. Alternatively to the additional 8:1 gear reduction, a 4800:1 gear ratio is used.

Extended Shaft

The rotatable extended shaft 710 of the rotational gear reducer 408 must handle the high torque loading distributed through the mechanical arms. The extended shaft 710 preferably serves as the main torque carrier during the rotational translation of the mechanical arms and sensor pod 126. Each output shaft from the gear reducer carries a load of 24,375 in-lb. With a torque of about 65,000 in-lbs, a safety factor of 1.5, an even load distribution across four mechanical arms, a dynamic load factor of 1.5, and an extended shaft diameter of about two inches (standard size output for the preferred rotational gear reducer 408), the maximum stress applied to the extended shaft 710 is about 31,035 psi. Thus, a 1045 carbon steel shaft having a yield strength of 77,000 psi is preferably used as the extended shaft 710, thereby providing a safety factor of two. This safety factor serves as a precautionary measure in the event that the torques on the extended shaft 710 are not distributed evenly.

The shaft key way connecting the extended shaft 710 to couplers must also withstand the forces handled by the extended shaft 710. Key selection also depends heavily on the standard size key ways used on the flex coupler described below. With a 24,375 psi torque and a one inch radius, a ¾" by ¾" keyway requires a 2.4 inch length keyway resulting in a 4.73 factor of safety. This high factor of safety is preferred in case the loading is not distributed equally on the extended shaft 710. Alternatively, a ¾" by ⅜" keyway may be used with a length of three inches. Both ends 712, 714 of the extended shaft have these key ways and are intended to take the loading simultaneously and distribute it evenly.

Two inch diameter output shafts 716, 718 are preferably attached to the extended shaft 710 of the rotational gear reducer 408 and provide the length needed for the mechanical arms to attach. A coupling such as a Steelflex flexible coupling, preferably attaches the extended shaft ends 712, 714 to the output shafts 716, 718, and also compensates for misalignment between the output shafts 716, 718 and the extended shaft 710 of the rotational gear reducer 408. In a preferred embodiment, a Steelflex coupler such as is manufactured by Falk Corporation is preferably used. The steel grid of the Steelflex coupling is able to rock and pivot within the coupling's hub teeth. This allows for significant misalignment that will not cause bearing side loads. It also provides torsional flexibility when subjected to shock or vibratory loads. The Steelflex couplings act like a shock dampener during rotary motion.

A mechanical attachment hub preferably attaches the mechanical arms to the output shafts 716, 718. The hub locks together the mechanical arm and the hub by sufficiently strong bolts, such as grade 8 bolts, and then locks the mechanical arm/hub system to the output shafts 716, 718 by means of a hub key way.

Bearing shaft supports preferably support the rotational gear reducer 408, coupling, extended shaft 710, output shafts 716, 718, hub, and mechanical arms. The bearing shaft supports provide placement support for the rotating shaft during its use. For symmetry and support, two shaft support bearings are used on each output shaft 716, 718 of the rotational system. Each shaft support bearing is preferably cast iron and preferably has a dynamic load capability of about 9,800 lbs. Each bearing is preferably capable of supporting a shaft rotational speed of up to 1,575 rpm.

In a preferred embodiment, nearly the entire lengths of the extended shaft 710 and output shafts 716, 718 are covered with components that align, support, or join each component of the system together. Additional shaft collars are preferably inserted outside the mechanical arm/hub assembly to provide additional reinforcement to prevent movement in the horizontal direction along the extended shaft 710 and output shafts 716, 718.

Mechanical Arm/Pod System

Figure 9:
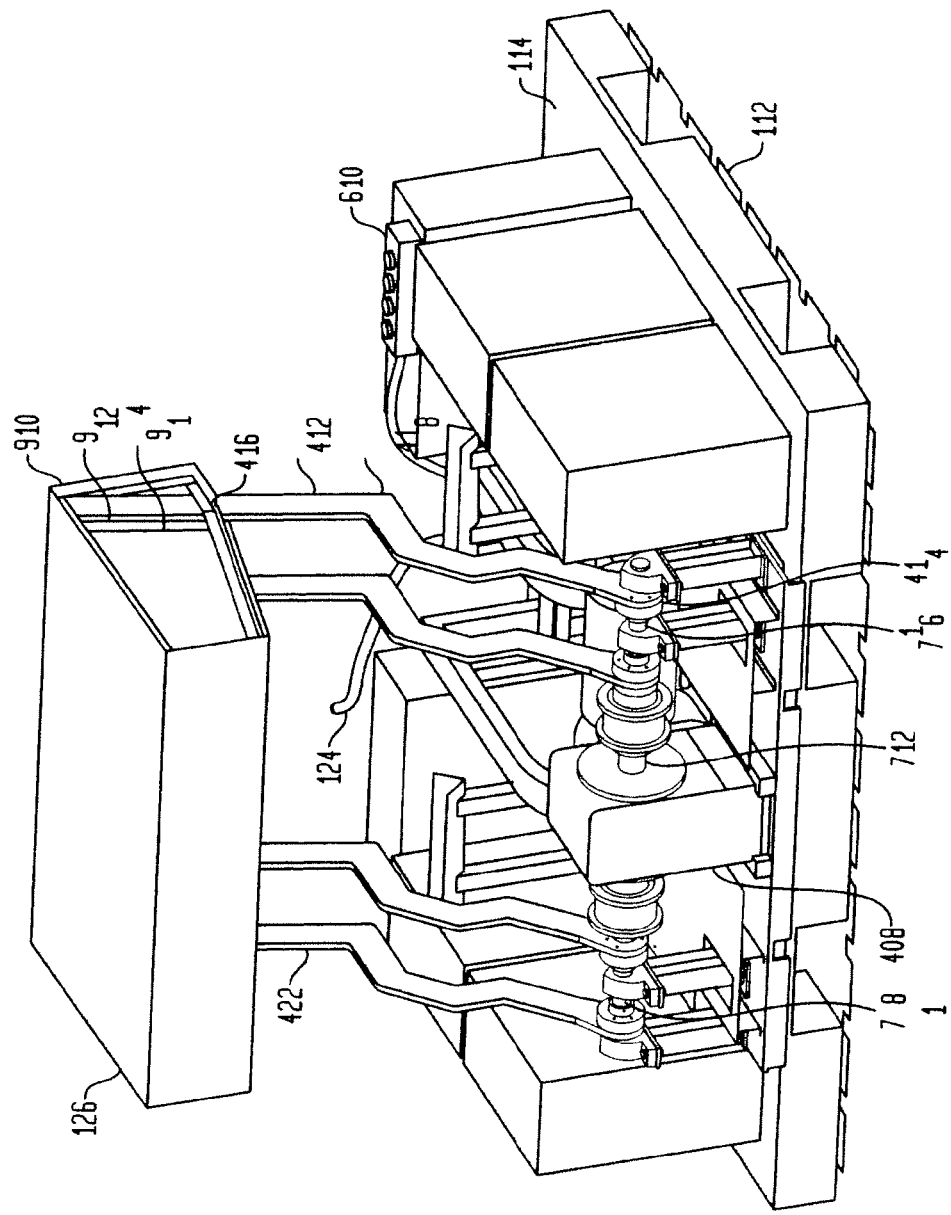
FIG. 9 is a perspective view of an alternative embodiment of the sensor pallet system of FIG. 4 showing a sensor pod in a near "stow" position.
Figure 10:
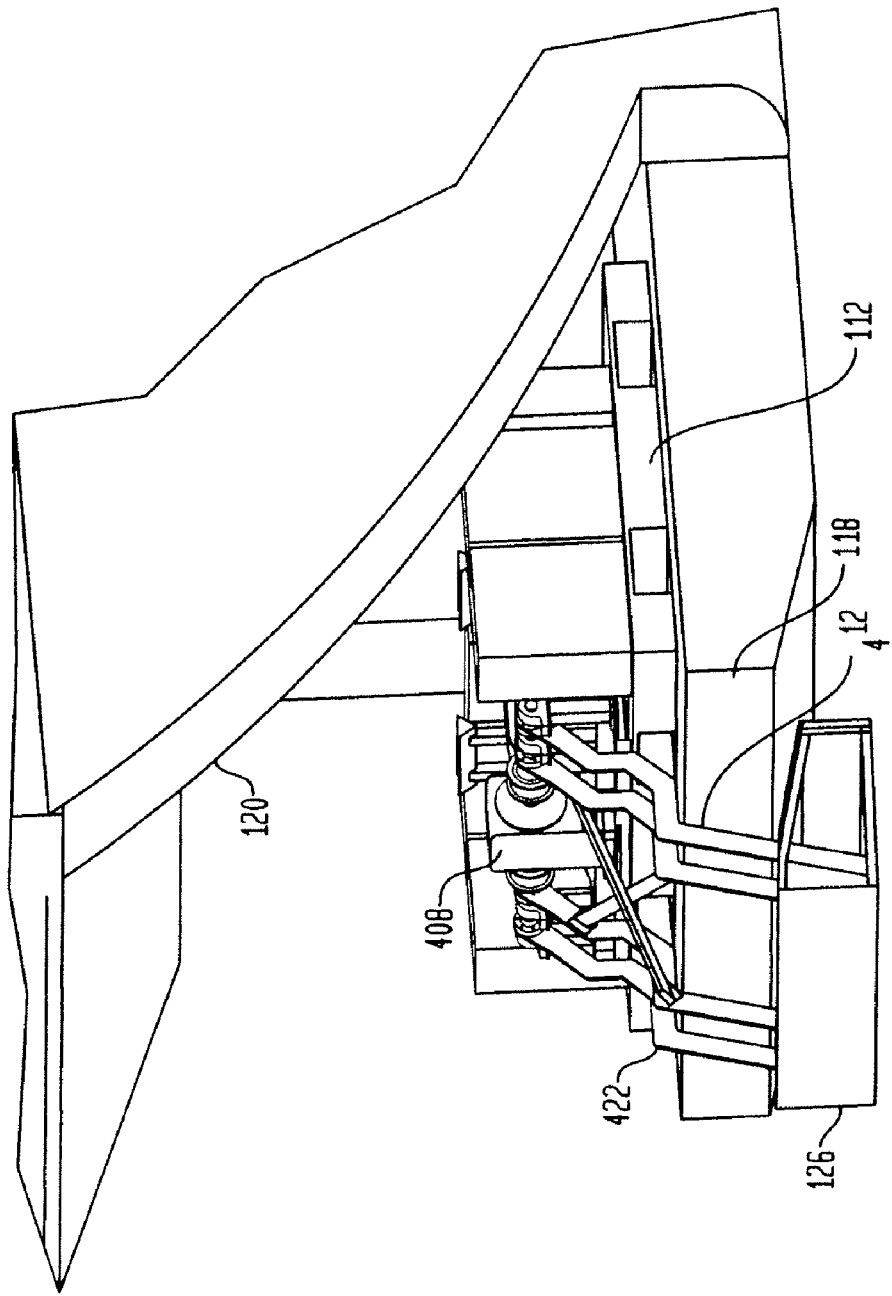
FIG. 10 is a perspective view of another alternative embodiment of the sensor pallet system of FIG. 4 loaded on the rear cargo ramp of an aircraft with a sensor pod extended out a rear opening.

The mechanical arm/pod system translates outside the opening (e.g., the rear cargo door) of the aircraft 120. The objective of the mechanical arms 412, 422, 424, 426 are to transfer the sensor pod 126 from the "stow" position inside the aircraft 120, as shown in FIG. 9, to the final operating position underneath the rear cargo ramp of the aircraft 120, as shown in FIG. 10. The mechanical arms 412, 422, 424, 426 are directly connected to the output shafts 716, 718 (by way of the connection hubs) of the rotational system. The sensor pod 126 is capable of withstanding the forces generated by the aerodynamic drag outside of the aircraft 120, and creates a stable environment (minimal vibration) for sensor data collection. The sensor pod 126 preferably directly connects to the mechanical arms 412, 422, 424, 426 and houses the sensors 914 that are used during the flight mission.

In an alternate embodiment, the mechanical arm/sensor pod system need not be a single component; but a series of locks can be placed along the connection region. These locks then position and hold in place the translation of the sensor pod 126 along the mechanical arms 412, 422, 424, 426 to determine the clearance space between the mechanical arm/pod system and the bottom of the rear cargo ramp. Once position is fixed, the sensor pod 126 can further be allowed to rotate.

Mechanical Arms

Preferably four mechanical arms 412, 422, 424, 426 are suitably spaced along the length of the sensor pod 126 to allow the sensor pod 126 to hold a predetermined amount of, for example, five hundred pounds of sensor 914 weight. The preferred positioning on the output shafts 716, 718, preferred size, preferred shape, and preferred material makeup of the mechanical arms 412, 422, 424, 426 take into account the surface contour 118 of the face of the rear cargo ramp opening 116 of the aircraft 120, the weight of the sensors 914, and the aerodynamic drag on the mechanical arm/pod system. The positioning of the mechanical arms 412, 422, 424, 426 is also affected by the fact that both output shafts 716, 718 have numerous mechanical components, including support bearings, hubs, collars, and flex couplings. The width of the rotational gear reducer 408 can also prevent separation of the mechanical arms 412, 422, 424, 426 at equal distances along the output shafts 716, 718.

In one embodiment, the mechanical arms 412, 422, 424, 426 are shaped to perfectly mold to the surface contour 118 of the rear cargo ramp opening 116 of the aircraft 120. However, the mechanical arm geometry is preferably simplified from this ideal shape for simplification of design and construction. In the final operational position, the mechanical arms 412, 422, 424, 426 touch the rear cargo ramp at two contact points. Additionally, the sensor pod 126 preferably contacts the bottom of the rear cargo ramp to provide a wedge to stabilize the sensor pod 126.

Each mechanical arm 412, 422, 424, 426 preferably has a total height of about fifty-eight inches, a width of about three-quarters of an inch, and a depth of about four inches. Any number of mechanical arms may alternatively be used, including just a single mechanical arm. Cross-member supports may optionally connect two or more mechanical arms 412, 422, 424, 426 for increased structural support and stability.

Sensor Pod

Aerial sensors 914 are preferably operated within a housing for protection. Thus, the sensor pod 126 preferably houses all of the sensors 914 used on the sensor platform. The sensor pod 126 is able to withstand the loading due to the aerodynamic drag force and is easily altered (machined, welded, tapped, etc.) to accommodate various types of sensors 914 with their respective connecting equipment and procedures. The sensor pod 126 is preferably constructed as lightweight as possible without compromising the structural strength needed for its rugged application.

The sensor pod 126 must adjust to mesh with the mechanical arm 412, 422, 424, 426 structure. The sensor pod 126 preferably has mounting locations for each mechanical arm 412, 422, 424, 426 and is shaped to provide a wedge structure for stability and vibration dampening. The width and height of the sensor pod 126 are therefore influenced by the location and geometry of the mechanical arms 412, 422, 424, 426. In a preferred embodiment the maximum height for the sensor pod is from the bottom of the rear cargo ramp to the end of the mechanical arms 412, 422, 424, 426 during the operational final position. This maximum height is preferable such that no contact is made between the sensor pod 126 and the rear cargo door during deployment movement. The width of the sensor pod 126 is preferably sixty inches (including the outside framing of the sensor pod 126) to conform to the overall distance between the first mechanical arm 412 and the second mechanical arm 422. The depth of the sensor pod 126 is designed to accommodate various sensor 914 sizes without increasing beyond a reasonable size and should not produce a "second wing" in the rear of the aircraft 120 that would interfere with the pilot's maneuvering of the aircraft 120 by causing an untrimmable aerodynamic force to the aircraft 120.

One embodiment of the sensor pod 126 allows for sensor 914 mounting along the entire body of the sensor pod 126. The body of the sensor pod 126 is preferably constructed from one-fourth inch aluminum plate for the sides, three-eighths inch aluminum plate for the bottom, and one-half inch aluminum plate for the top to create a surface to which sensors 914 may be attached, preferably bolted. The sensor pod 126 has an outer surface for placement of the sensors 914, and is attached to a frame to structurally stabilize the sensor pod 126. The frame is preferably attached directly to all mechanical arms 412, 422, 424, 426 to create the mechanical arm/pod system.

Another embodiment of the sensor pod 126 minimizes sensor pod 126 weight and thus allows for greater sensor 914 weight within the sensor pod 126. This alternate embodiment preferably includes a frame with an aluminum skin structure that supports sensors 914 inside the pod. The aluminum skin structure, or sensor pod outer surface 910, protects the sensor pod inner cavity 912 defined by the sensor pod outer surface 910, thereby preventing harm to the sensor 914 equipment inside. The frame is a support skeleton bracing the structure in place, and is preferably made of L-channel aluminum (2.5"× 2.5"×0.25"). All components of the frame structure are preferably welded together and are preferably attached to the mechanical arms 412, 422, 424, 426 by a series of bolts. Preferably, the top plate is constructed from one-half inch aluminum plate to provide a base to mount various sensors 914. The sensor pod 126 preferably has a height of about 11.21 to 16.51 inches, a depth of about 35.5 to 36.26 inches, and a length of about 59.75 inches. Additionally this top, or mounting, plate may be attached with suitable vibration isolators to allow the operation of vibration sensitive equipment.

The system 100 may optionally have a small electrical rotational motor preferably positioned in the center of the sensor pod 126 housing. This motor system is capable of adjusting the sensor pod 126 angle by small increments from approximately negative twenty to about positive twenty degrees with respect to an initial viewing angle of zero degrees with respect to the ground. These approximate angles are limited by restrictions in rotating the sensor pod 126 back into the bottom of the rear cargo ramp of a C-130 aircraft 120; alternative maximum sensor pod 126 angles can be achieved in different models of aircraft 120. The rotation angle is also influenced by the desired field of view capabilities of the sensors 914 inside the sensor pod 126. The rotation of the sensor pod 126 is automatically controlled, or is controlled by an operator. The operator preferably administers these controls from within the operator station 102 located inside the aircraft 120.

The sensor pod 126 rotational system may operate completely independent of the rotational movement of the mechanical arm/pod system. The mechanical arm/pod system is preferably deployed in the final operating position before this sensor pod 126 rotational system is used. For this optional sensor pod 126 rotational system to improve the field of view of an object that is located on the ground in the opposite direction of the direction the aircraft 120 is flying, the sensor pod 126 rotational system must rotate clockwise. This clockwise rotation increases the capable line of sight of the sensors 914 in the sensor pod 126 significantly depending on the altitude of the aircraft 120. The capable line of sight of the sensors 914 increases as the altitude of the aircraft 120 increases. This system is capable of increasing the line of sight in the same direction that the aircraft 120 is traveling. This is accomplished by reducing the amount of view obstruction caused by the "belly" of the aircraft 120. The counterclockwise rotation employs an additional translation movement to increase the field of view. The clockwise translation first translates lower on the mechanical arms 412, 422, 424, 426 to obtain more clearance between the sensor pod 126 and the bottom of the rear cargo ramp. This distance determines how much the sensor pod 126 can rotate back into the cargo ramp. The counterclockwise rotation may rotate twenty degrees in a negative direction, but is limited by the relationship of the translation along the mechanical arms 412, 422, 424, 426 and the angle of rotation.

The present invention allows for the aircraft 120 ramp to be fully open or partially closed. The sensor pod 126 therefore automatically rotates to maintain the proper field of view for the sensor pod 126, depending on the particular positioning of the aircraft 120 ramp. The operator may override this automatic rotation to further increase the sensor pod's 126 field of view when required. Sensors 914 may include optical cameras, inertial navigation systems, global positioning system receivers, heat sensors, infrared sensors, ultraviolet sensors, radiation sensors, and any other type of equipment including but not limited to various sensing and communications equipment.

Electrical Control System

Electrical power for running the system 100 is preferably obtained from the aircraft 120. Thus, electrical plug connections 122 for receiving power are preferably located on the shelter box 108. In particular, multiple power connections for receiving 400 Hz 208 Vac and 28Vdc are preferred, and alternative power connections may also be used. An electrical line 124 preferably runs from an electrical plug connection 122 to the sensor pallet system 104. Additional data lines and/or power lines may run from the shelter box 108 and/or the aircraft 120 to the sensor pallet system 104, and may ultimately run to the sensor pod 126 for connection to the sensors 914. Such data lines may transfer data and/or information gathered by the sensors 914 to the operator station computer or computers 110, or alternatively such data may be transferred using conventional wireless transmission equipment and means.

ABM6E42Z11 CENTSABLE IFC (from Automation Direct) mechanical limit switches are preferably used in the control circuit on the sensor pallet system 104. CT1-AP-1A capacitive proximity sensors from Automation Direct are preferably used for the automatic mode of the sensor pallet system 104. Flexible conduit used to house the connection of the power and programmable logic controller (PLC) boxes to the base rail plate 406 is preferably Conduflex, which is corrosion resistant and has a stainless steel outer shell and a cable friendly fiber-reinforced nylon liner.

The sensor pallet system 104 preferably uses a PS24-075D+24VDC power supply to power up the proximity sensors and as an operator pendent control 610 input signal.

The sensor pallet system 104 preferably uses a D0-06DD2 Programmable Logic Controller or PLC (from Automation Direct) for the implementation of automatic deployment and stowing modes on the sensor pallet system 104. A 4-channel F0-04AD-1 analog input module is preferably used in conjunction with the D0-06DD2 PLC. A D0-08CDD1 digital input/output module is also preferably used in conjunction with the D0-06DD2 PLC. A CLN-50 Hall Effect current sensor is preferably used in the implementation circuit of the automatic mode on the sensor pallet system 104. A QL2X1-D24 series relay is preferably used in the implementation of the control circuit on the sensor pallet system 104. The sensor pallet system 104 also preferably uses Klixon series 7274-11 aircraft circuit breakers with current ratings of 10 Amps and 20 Amps. Power and PLC electrical boxes are preferably made of aluminum 6061.

Figure 8:
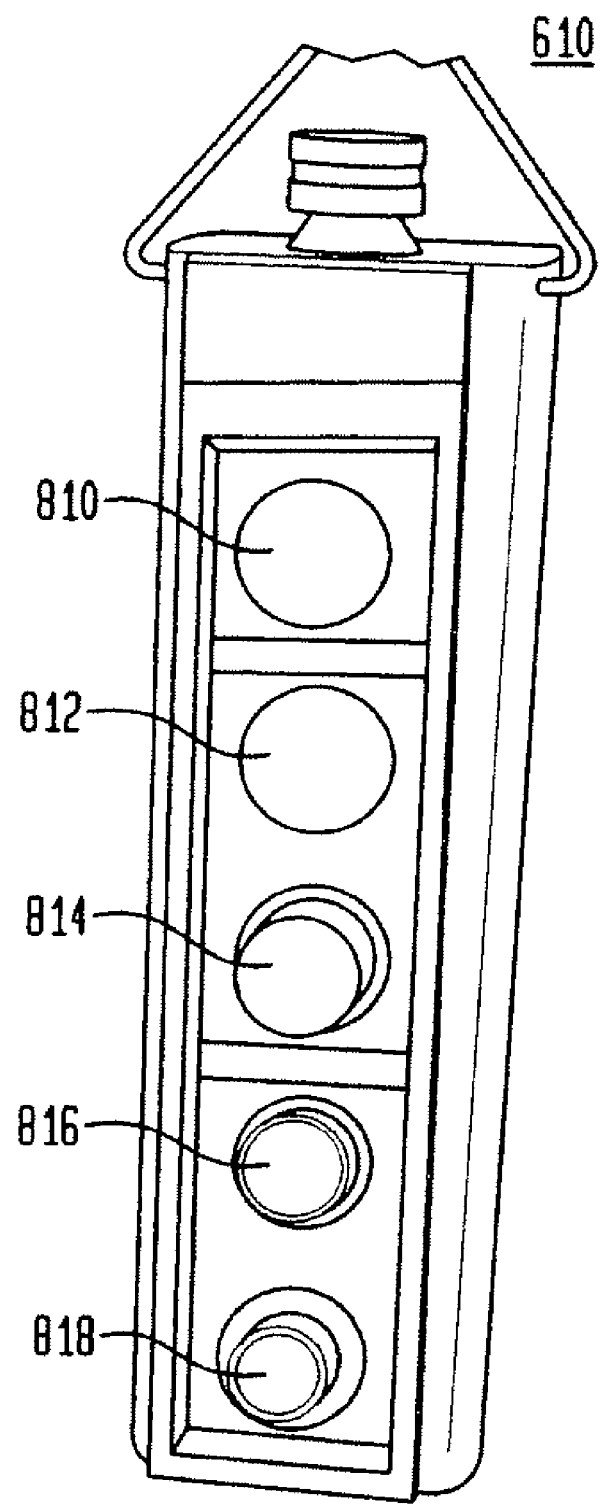
FIG. 8 is a perspective view of an embodiment of a pendent control of the sensor pallet system of FIG. 6.

The sensor pallet system 104 preferably has both automatic mode and manual mode. An operator pendent control 610, as shown in FIG. 8, attached to the sensor pallet system 104 preferably has an emergency stop button 810, an extend button 816, and a stow button 818, as well as an automatic/manual switch 812 and a translate/rotate switch 814. The sensor pallet system 104 preferably uses a NewMar Telecommunication PM-24-35 series power module. The sensor pallet system 104 also preferably uses a Varner TSC24-4500D power inverter and optional TSR remote control.

Use of the System

The following procedures are preferably used for loading embodiments of the system 100 onto the aircraft 120. First, a forklift places the operator station 102 inside the aircraft 120. Second, the operator station 102 is slid to a standard cargo location in order to balance the aircraft 120. Other cargo and pallets may be placed fore or aft of the operator station 102 provided no obstructions result. A preferred maximum of four cargo pallet positions may be between the operator station 102 and the cargo ramp. Third, a forklift places the sensor pallet system 104 on the cargo ramp. The aft edge of the sensor pallet system 104 is preferably about seventeen inches from the edge of the rear door. Fourth, the aircraft 120 weights and balance are preferably verified using a loadmaster standard worksheet. Fifth, the system 100 preferably undergoes testing and initialization. Specifically, the sensor pod 126 is deployed via standard operating procedures. The ramp may be raised if any instrument or sensor 914 protrudes from the bottom of the sensor pod 126. If required by any sensor, an inertial navigation unit may then be initialized. The sensor pod 126 is then preferably retracted into a stowed position inside the aircraft. Certain sensor systems such as an inertial navigation unit may require to be powered from this point on, but the rest of the system may be shut down. The aircraft 120 ramp and door are then preferably closed to the extent desired. Sixth and finally, the aircraft 120 may take off.

The following standard operating procedures are preferably used for deploying and retracting the sensor pod 126. First, the system 100 is loaded onto the aircraft 120 using the loading instructions set forth above. Second, the aircraft 120 takes off. Third, any required system components of the system 100 may be powered up. Specifically, the operator station 102 may be connected to winch power connections of the aircraft 120 using the electrical plug connection 122, then the sensor pallet system 104 is connected to the operator station 102 using the electrical line 124. Fourth, the cargo ramp and door are preferably opened. Fifth, the sensor pod 126 may be deployed. Specifically, automatic mode may be selected on the automatic/manual switch 812 on the operator pendent control 610. Then the extend button 816 may be pressed on the pendent control 610. Then the proper movements may be verified by the operator: translate out, rotate out, and translate in. If the system 100 does not respond, then the emergency stop button 810 on the operator pendent control 610 may be pressed, and the manual operation instructions below may be followed. Sixth, the sensor pod 126 is preferably deployed. Seventh, the sensors 914 may powered up if required. Eighth, sensor data preferably is collected. Ninth, the sensors 914 are optionally powered down as may be required. Certain sensor components, such as an inertial navigation unit, may be required to remain powered if the mission requires additional deployments of the sensor pod 126. Tenth, the sensor pod 126 may be retracted. Specifically, automatic mode may be selected on the automatic/manual switch 812 on the operator pendent control 610. Then the stow button 818 may be pressed on the operator pendent control 610. Then the proper movements are preferably verified by the operator: translate out, rotate in, and translate in. If the system 100 does not respond properly, the emergency stop button 810 on the operator pendent control 610 may be pressed, and the manual operation instructions below may be followed. Eleventh, the cargo ramp and door may be closed. Twelfth and finally, the aircraft 120 is ready to land and the system 100 is ready to be unloaded using the unloading procedure.

For unloading, a forklift may be used to unload the sensor pallet system 104 from the aircraft 120. Then a forklift may be used to unload the operator station 102 from the aircraft 120.

The following manual operation instructions preferably are used for retrieval of the sensor pod 126 if there is an incorrect response in the system's automatic mode. First, the current position and the desired movement and direction should be determined by the operator. Second, manual mode may be selected on the automatic/manual switch 812 on the operator pendent control 610. Third, the proper motion, either translate or rotate, may be selected on the translate/rotate switch 814 on the operator pendent control 610. Fourth, the proper direction, either extend or stow, may be selected by preferably pressing either the extend button 816 or the stow button 818 on the operator pendent control 610. Fifth, steps three and four may be repeated until the sensor pod 126 is in the stowed position. Sixth, if manual mode does not work, then the emergency stop button 810 should be checked to be in the released position on the operator pendent control 610. Seventh and finally, if the system 100 does not respond, then preferably proceed to the emergency operation set forth below.

The following emergency operation instructions may be used if there is an incorrect response in the manual mode. First, the emergency stop button 810 may be pressed on the operator pendent control 610. Second, power is preferably turned off to the sensor pallet system 104. Third, the current position and the desired movement and direction are determined. Fourth, an auxiliary adaptor may be retrieved and placed on a manual input shaft of the desired motion motor, either the rotational gear reducer motor 410 or the linear actuator motor 402 and if applicable any breaks or stops are released. Fifth, the appropriate motor shaft 402, 410 is moved. Alternatively the shafts may be rotated with a battery or backup power operated rotary-like tool such as a drill. For manual driving via a manual crank, rotation of the auxiliary adaptor counterclockwise results in stowage. Sixth, steps 2, 3, and 4 are preferably repeated until a stowed position is achieved. Seventh, the auxiliary adaptor and all parts used to move the sensor pod 126, including any auxiliary powered device or manual crank, may be removed and stored. Eighth, all power may be turned off to the system 100. Ninth, the cargo ramp and door may be closed. Tenth and finally, the aircraft 120 is ready to land and unload.

Structural Enhancement System

Figure 11:
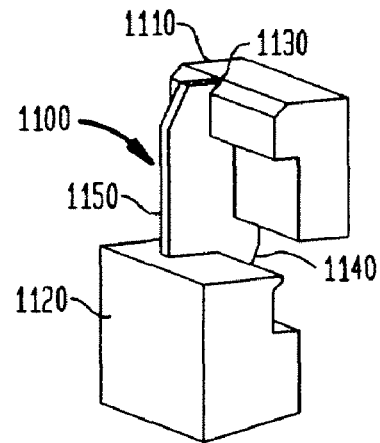
FIG. 11 is a perspective view of an embodiment of a locking device of the present invention connecting the rear upper door locking mechanism and the rear lower ramp locking mechanism of the aircraft.
Figure 12:
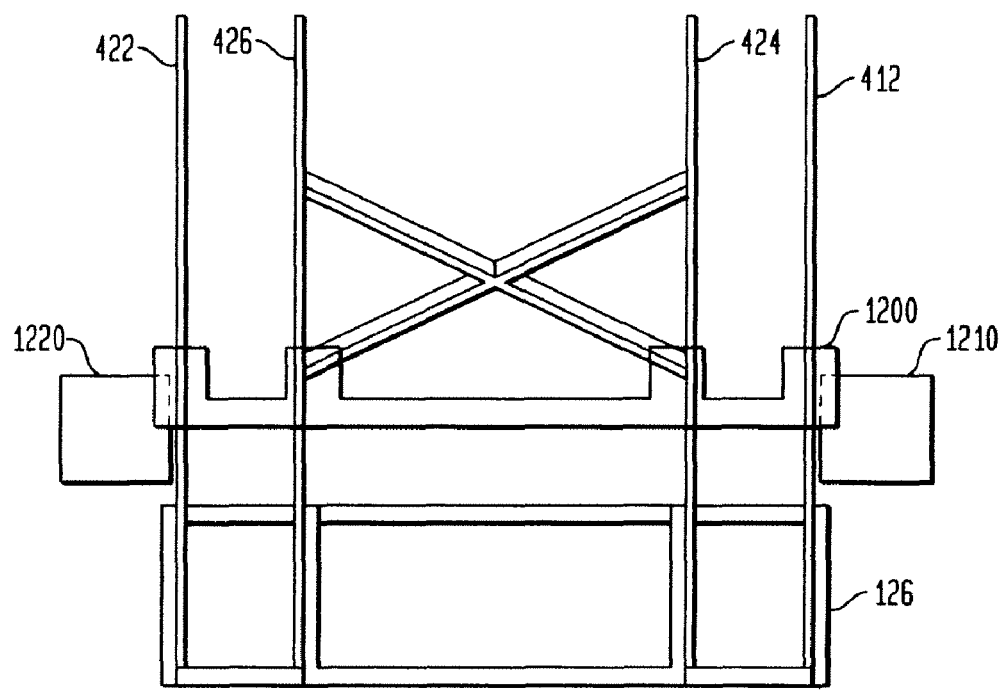
FIG. 12 is a front elevation view of an embodiment of a sealing system of the present invention.
Figure 13:
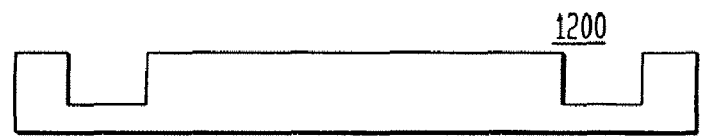
FIG. 13 is an alternative front elevation view of the sealing system of FIG. 12.
Figure 14:
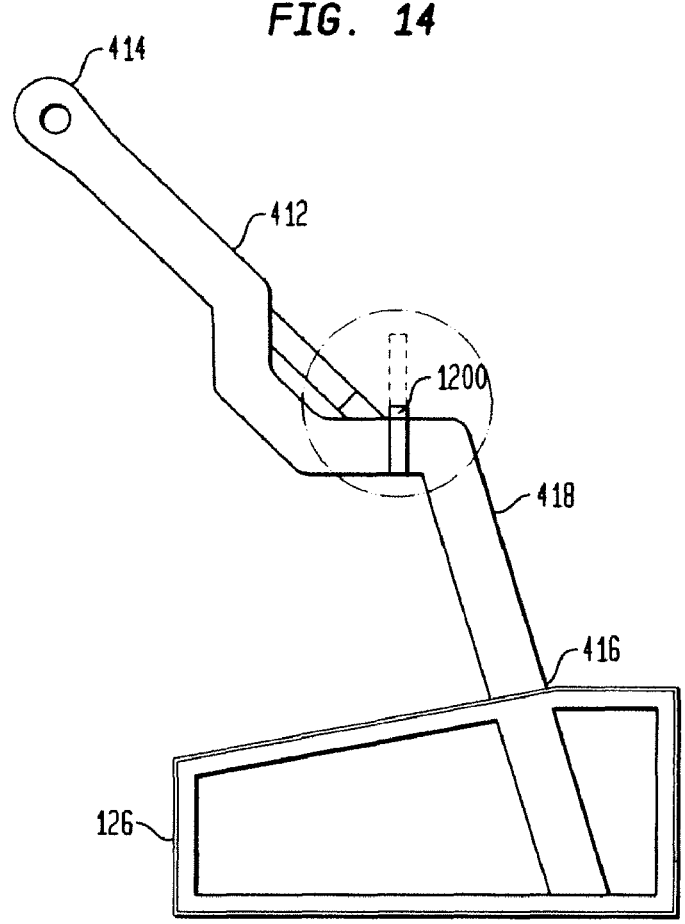
FIG. 14 is a side elevation view of the sealing system of FIG. 12.
Figure 15:
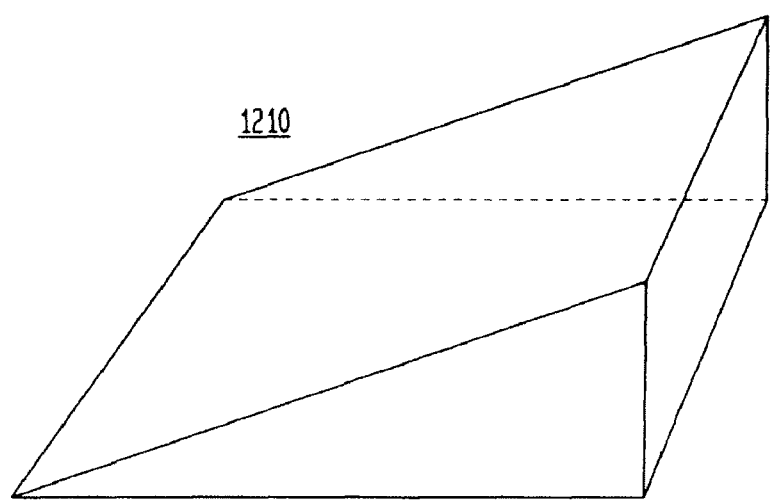
FIG. 15 is a perspective view of a side wedge portion of the sealing system of FIG. 12.

Fully closing the rear lower cargo ramp of the aircraft 120 enhances support of the aircraft 120 tail. Fully closing the rear lower cargo ramp when the sensor pod 126 is deployed requires that the rear upper door remain partially opened. However, the rear upper door on a C-130 aircraft 120 cannot remain partially open by itself. Thus the present invention includes a locking device 1100 that connects to the rotating part of the system 100, engages the rear upper door locking mechanism 1110 on the rear upper door of the aircraft 120, and connects it to the corresponding rear lower ramp locking mechanism 1120 on the rear lower ramp of the aircraft 120, as shown in FIG. 11. An alternate embodiment allows the aircraft upper door to fully close while holding the cargo ramp firmly to minimize vibration and provide further support to the tail. This locking device 1100 provides additional stability to the sensor platform system 104 and reassures the system operator or loadmaster that the sensor platform system 104 is in the fully deployed position. A bladder like sealing system as described below may then be used to seal the cargo hold of the aircraft 120.

The locking device 1100 preferably comprises an upper catch 1130 that contacts the rear upper door locking mechanism 1110 and holds firmly thereto, a lower catch 1140 that contacts the rear lower ramp locking mechanism 1120 and holds firmly thereto, and a body section 1150 that rigidly connects the upper catch 1130 and the lower catch 1140. The locking device 1100 preferably is shaped to substantially mold to the contours of the rear upper door locking mechanism 1110 and the rear lower ramp locking mechanism 1120. The upper catch 1130 and the lower catch 1140 have projecting members for firmly holding the rear door locking mechanisms 1110, 1120 in place, but they may have alternative detachable fastening means such as pins, clamps, clips, hooks, clasps, connections, latches, pegs, dowels, and other fasteners.

With the sensor pod 126 in position, the aircraft rear lower ramp can be closed to within a few inches of complete closure. The rear lower ramp in this position, for stability, is preferably locked into position using the locking device 1100. To seal the remaining area of the opening 116, the present invention includes a sealing system having a means of holding onto both the rear upper door and the rear lower ramp of the aircraft simultaneously.

Sealing System

One embodiment of a sealing system is a two-piece bladder-type sealing system having a center bladder 1200 and two or more "pie-shaped" regions 1210 as shown in FIGS. 12-15. This embodiment of a sealing system is physically integrated with the sensor pallet system 104 or is integrated with a part of the aircraft 120 ramp assembly. It is also useable with or without the structural enhancement system. This two-piece system has a center bladder 1200 that is limited spatially by the amount of open space between the top cargo door and the bottom ramp, as well as the interference caused by the mechanical arms 412, 422, 424, 426. This system inflates to mold to and completely block the entire opening 116 created in between the rear cargo door and the rear cargo ramp. The center bladder 1200 attaches to the rear upper cargo door from the sensor pallet base platform 112 to create a "bladder" region that effectively seals the opening 116.

An alternative embodiment of the center region 1200 has two center bladders. A lower center bladder is affixed to the rear lower ramp, and an upper center bladder, which is a mating half of the lower center bladder, is affixed to either the rear upper door of the aircraft 120 or to the top edges of the mechanical arms 412, 422, 424, 426, such that when the rear lower ramp closes toward the rear upper door the lower center bladder mates with the upper center bladder to become connected. Then, expandable bladders within the upper center bladder and lower center bladder are energized to seal this embodiment of the two-piece bladder-type sealing system.

The two-piece bladder-type sealing system preferably includes two or more side bladders 1210 that inflate to create quarter pie shapes to fill the gaps in between the rear cargo doors (upper door and lower ramp) as well as the side void areas left open during an incomplete closing of the rear cargo door. A preferred embodiment uses two such side bladders 1210. In this system the two side bladders 1210 are added onto the system before the aircraft 120 becomes airborne. Each side bladder 1210 inflates from the sensor pallet base platform 112 and mates with the rear upper cargo door. These two side bladders 1210 have a frame that provides the necessary structural integrity as if the rear upper and lower cargo door/ramp were closed and locked. This creates two closed side systems for a complete sealing of the rear cargo door while the actual rear cargo doors remain ajar by approximately four inches. This slight distance is minimal and includes the thickness of the mechanical arms 412, 422, 424, 426 (from the sensor pallet base platform 112) and a cushioning region on top of the mechanical arms 412, 422, 424, 426 to eliminate metal-to-metal contact between the mechanical arms 412, 422, 424, 426 and the rear upper cargo door. This two-piece bladder-type sealing system also provides a structurally stable sealing system that enhances the stability of the rear cargo door/ramp while in flight.

An alternative embodiment of the perimeter sealing system is a one-piece complete bottom door perimeter sealing system and can be physically independent of the herein-described sensor pallet system 104. This system is universal for sealing the rear cargo doors of an aircraft 120, preferably a C-130 aircraft (with or without the standardized sensor pallet system 104 in place), when the rear cargo doors are not closed. This one-piece system is placed on the lower rear cargo ramp of the aircraft 120, and it extends around the front and sides of the ramp/door. It is preferably attached to the standard rear lower ramp locking mechanism 1120 along the perimeter of the rear lower cargo ramp and is latched onto the rear upper cargo door to provide a sealing and structurally capable system to enclose the region left void when the two doors/ramp are not fully closed.

This system accommodates various opened positions varying from about two to about twelve inches. The system accounts for and molds to the angle created by the rear lower cargo ramp rising to close and the rear upper cargo door lowering to close. As the open area of the opening 116 increases, the thickness of the sealing system increases to provide additional structural support to the rear cargo doors/ramp.

Both of these embodiments enhance the capabilities of the standardized sensor pallet system 104 for an aircraft 120 as well as for the aircraft 120 itself. Both embodiments provide a solution to the problem of sealing the rear cargo doors/ramp of the aircraft 120 when the doors/ramp are not closed completely. Both embodiments are completely self-sufficient and do not require any modification to the aircraft 120 or to standard flight procedures taken by the end-user. Both embodiments do not create any interference with the pilot's control of the aircraft 120. Both embodiments are preferably completely capable of being used on any C-130 aircraft (variants B through J) 120, and are preferably mounted to the aircraft 120 in a similar manner.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A sensor pod deployment system for use in conjunction with an aircraft having a rear cargo area and rear cargo ramp for accessing the rear cargo area, comprising:
   a truncated wedge shaped sensor pod containing an opening along its length for receiving one or more sensors
   a sensor pallet base platform attached to the rear cargo ramp;
   one or more mechanical arms connecting the sensor pod to the sensor pallet base platform; and
   wherein a top face of the sensor pod is configured to correspond to a shape of an outer surface of the rear cargo ramp during deployment underneath the cargo ramp.

2. The sensor pod deployment system of claim 1, further comprising an inflatable sealing bladder secured along an opening of the aircraft, such that upon its inflation the sealing bladder seals the opening and acts as a differential pressure barrier.

3. The sensor pod deployment system of claim 1, wherein the mechanical arms are spaced along the length of the sensor pod.

4. The sensor pod deployment system of claim 3, wherein the mechanical arms are compatibly shaped with the rear cargo ramp.

5. The sensor pod deployment system of claim 1, wherein the length of the front face of the sensor pod is about 1.5 to 2 times greater than the depth of the sensor pod.

6. The sensor pod deployment system of claim 1, wherein the length of the front face of the sensor pod is about 3.5 to 5.5 times greater than the height of the front face of the sensor pod.

7. The sensor pod deployment system of claim 1, wherein the top face is a flat surface extending from a front face of the sensor pod to a back face of the sensor pod, and wherein the top face is adapted for abutting engagement with the outer surface of the rear cargo ramp.

8. The sensor pod deployment system of claim 7, further comprising vibration isolators on the top flat surface of the sensor pod.

9. The sensor pod deployment system of claim 1, further comprising a rotational motor positioned inside the sensor pod, wherein the rotational motor adjusts the sensor pod angle by small increments from approximately negative twenty to about positive twenty degrees with respect to an initial viewing angle of zero degrees with respect to a ground surface.

* * * * *